(12) United States Patent
Myers et al.

(10) Patent No.: US 7,147,154 B2
(45) Date of Patent: Dec. 12, 2006

(54) METHOD AND SYSTEM FOR ASSISTING A SHOPPER IN NAVIGATING THROUGH A STORE

(75) Inventors: Robert A. Myers, Cary, NC (US); Jeff D. Thomas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 10/426,082

(22) Filed: Apr. 29, 2003

(65) Prior Publication Data

US 2004/0217166 A1    Nov. 4, 2004

(51) Int. Cl.
*G06K 15/00* (2006.01)
(52) U.S. Cl. .................. 235/383; 235/380; 235/472.01
(58) Field of Classification Search ................ 235/383, 235/380, 472.01; 705/14, 16, 23, 26
See application file for complete search history.

(56) References Cited

U.S. PATENT DOCUMENTS

| | | | | |
|---|---|---|---|---|
| 5,047,614 A | | 9/1991 | Bianco | 235/385 |
| 5,073,749 A | * | 12/1991 | Kanayama | 318/587 |
| 5,409,342 A | * | 4/1995 | Galli | 414/21 |
| 5,821,512 A | * | 10/1998 | O'Hagan et al. | 235/383 |
| 5,859,414 A | | 1/1999 | Grimes et al. | 235/383 |
| 5,887,271 A | | 3/1999 | Powell | 705/14 |
| 6,032,127 A | * | 2/2000 | Schkolnick et al. | 705/23 |
| 6,386,450 B1 | * | 5/2002 | Ogasawara | 235/383 |
| 6,535,793 B1 | * | 3/2003 | Allard | 700/259 |
| 6,584,375 B1 | * | 6/2003 | Bancroft et al. | 700/213 |
| 6,618,683 B1 | * | 9/2003 | Berstis et al. | 702/94 |
| 2002/0050526 A1 | | 5/2002 | Swartz et al. | 235/472.02 |
| 2002/0052674 A1 | | 5/2002 | Chang et al. | 700/300 |
| 2002/0065714 A1 | | 5/2002 | Goodwin, III | |
| 2002/0084323 A1 | | 7/2002 | Benyak | 235/383 |
| 2002/0138372 A1 | * | 9/2002 | Ludtke | 705/27 |
| 2002/0140688 A1 | | 10/2002 | Steinberg et al. | 345/205 |

* cited by examiner

*Primary Examiner*—Ahshik Kim
(74) *Attorney, Agent, or Firm*—Sawyer Law Group LLP (57) ABSTRACT

A method and system for assisting a shopper in obtaining item(s) desired by the shopper is disclosed. The method and system include allowing the shopper to provide the item(s) to a computer system and determining location(s) of the item(s) using the computer system. The method and system also include determining a route including the location(s) using the computer system. In one aspect, the method and system also include allowing the shopper to edit the at least one item after the route has been determined, determining an additional location for a new item using the computer system if a new item has been entered, and re-determining the route based on the shopper editing the at least one item using the computer system. In another aspect, the computer system resides on a robotic shopping cart. In this aspect, the method and system also include automatically driving the robotic cart to each of the location(s).

59 Claims, 4 Drawing Sheets

METHOD AND SYSTEM FOR ASSISTING A SHOPPER IN NAVIGATING THROUGH A STORE

FIELD OF THE INVENTION

The present invention relates to retail systems, and more particularly to a method and system for improving the ability of a consumer to navigate through a store.

BACKGROUND OF THE INVENTION

One mundane task that consumers engage in is shopping in retail stores, such as grocery stores. A major problem associated with shopping is locating the items that are of interest. For example, shoppers in a grocery store must locate the items on their shopping lists, then take their items to the checkout for purchase. Difficulties in locating items are compounded by unfamiliar stores, by changes in the store layout, and by retailer's desire to keep the shopper in the store in order to market additional products. The retailer's attempts to keep the shopper in the store are often in direct opposition to the shopper's desire to complete their task as quickly as possible. This is particularly true of grocery shopping. Although shoppers typically try to obtain the desired items in the most efficient manner, a shopper typically does not organize a shopping list based upon the items' locations in the store. A shopper may thus forget one or more items, causing the shopper to backtrack for the forgotten items. As a result, the shopper's trip to the store is prolonged.

Certain conventional systems do exist for improving the ability of a shopper to locate items of interest. These conventional systems allow a user to enter items of interest, typically using a Smart Card, personal digital assistant (PDA), scanner or other input/output (I/O) device such as a keyboard. The conventional system then provides the shopper with aids in locating at least some of the items entered. For example, conventional systems provide the shopper with locations of items within a store or directions to individual items within the store. Other conventional systems provide a map, including the route a shopper should take. Although some conventional system select the shortest route, other conventional systems provide a route that is circuitous in order to allow the retailer to have additional opportunities to market products to a shopper. In addition, some conventional systems for aiding shoppers suggest alternative and/or additional products. Typically, such conventional systems are centrally located, for example in a kiosk, available over the Internet to provide a printout at the user's home, or in a small conventional device having a screen attached to an ordinary shopping cart. A kiosk-based system is typically capable of printing out the aids so that the shopper can have the aids while shopping. However, the conventional system residing on a shopping cart typically includes a display to provide the user with information.

Although the conventional systems function, one of ordinary skill in the art will readily recognize that such systems may be not be flexible enough to adapt to a shopper's changing needs. One of ordinary skill in the art will also recognize that other, improved methods for aiding a shopper in locating desired items would also be useful. In addition, one of ordinary skill in the art will realize that retailers may benefit from continued access to a user's shopping list and an improved ability to market products.

Accordingly, what is needed is a system and method for improving the ability of a shopper to navigate through a store and locate the items of interest. The present invention addresses such a need.

SUMMARY OF THE INVENTION

The present invention provides a method and system for assisting a shopper in obtaining item(s) desired by the shopper. The method and system allow the shopper to provide the item(s) to a computer system and determining location(s) of the item(s) using the computer system. The method and system also determine a route including the location(s) using the computer system. In one aspect, the method and system also allow the shopper to edit the at least one item after the route has been determined, determine an additional location for a new item using the computer system if a new item has been entered, and re-determine the route based on the shopper editing the at least one item using the computer system. In another aspect, the computer system resides on a robotic shopping cart. In this aspect, the method and system also comprise automatically driving the robotic cart to each of the location(s).

According to the system and method disclosed herein, the present invention provides a method and system for improving the ability of a shopper to easily and efficiently find desired items.

DETAILED DESCRIPTION OF THE INVENTION

The present invention relates to an improvement in retail systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for assisting a shopper in obtaining item(s) desired by the shopper. The method and system comprise allowing the shopper to provide the item(s) to a computer system and determining location(s) of the item(s) using the computer system. The method and system also comprise determining a route including the location(s) using the computer system. In one aspect, the method and system also comprise allowing the shopper to edit the at least one item after the route has been determined, determining an additional location for a new item using the computer system if a new item has been entered, and re-determining the route based on the shopper editing the at least one item using the computer system. In another aspect, the computer system resides on a robotic shopping cart. In this aspect, the method and system also comprise automatically driving the robotic cart to each of the location(s).

The present invention will be described in terms of a particular computer system and particular products housed in a particular manner, such as in a retail store. However, one of ordinary skill in the art will readily recognize that this method and system will operate effectively for other computer systems, other products and other locations, such as warehouses. The present invention will also be described in the context of particular methods having certain steps. However, the method and system operate effectively for other methods having different and/or additional steps not inconsistent with the present invention.

Figure 1:
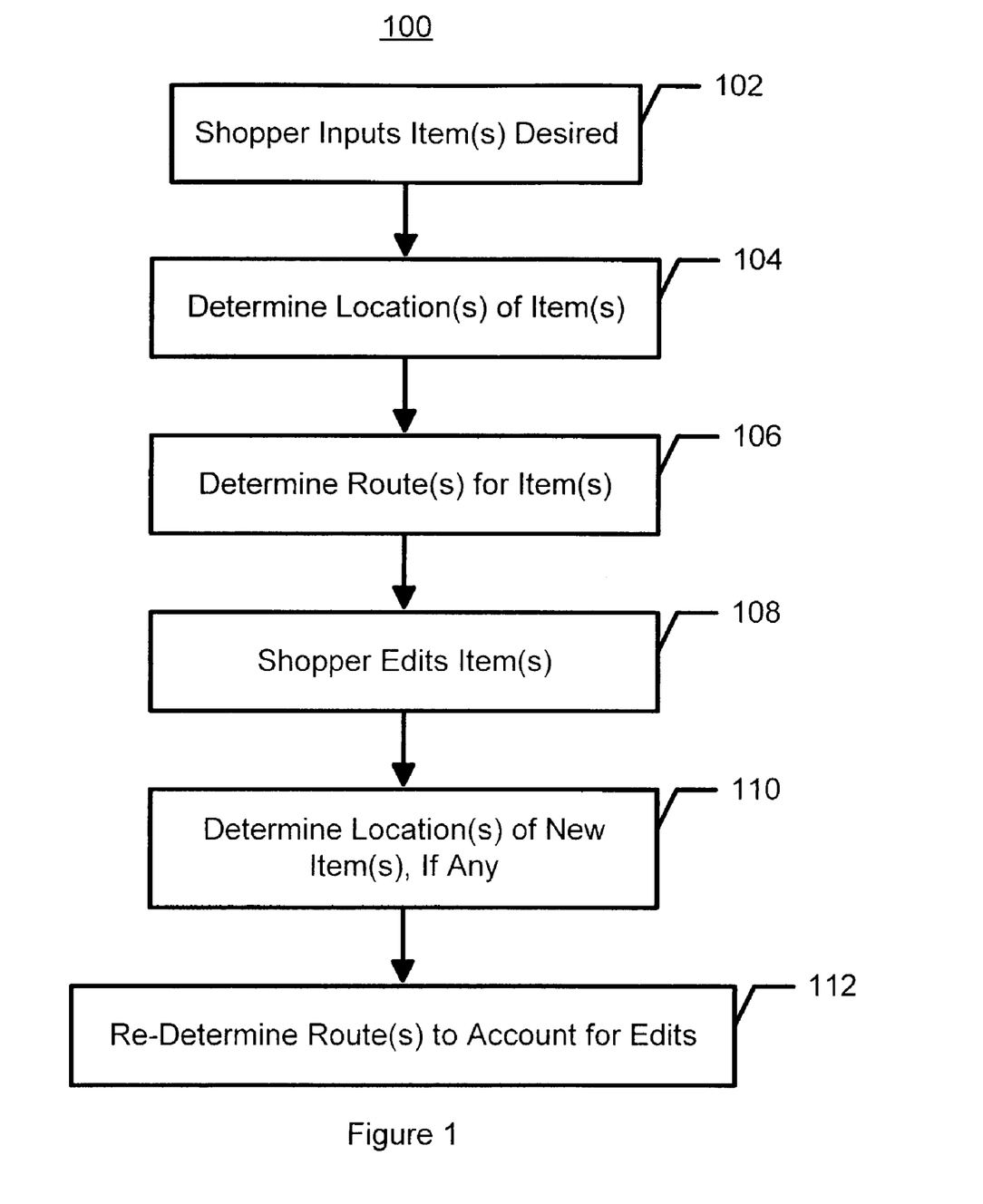
FIG. 1 is a flow chart depicting one embodiment of a method in accordance with the present invention for assisting a shopper in navigating to locate desired items.

To more particularly illustrate the method and system in accordance with the present invention, refer now to FIG. 1, depicting one embodiment of a method 100 in accordance with the present invention for assisting a shopper in navigating to locate desired items. A shopper is allowed to input the item(s) of interest to a computer system, via step 102. For example, a shopper might have a shopping list including multiple items for a trip to the grocery store, which would be entered in step 102. The shopper could enter the items in a number of ways. For example, the shopper may use a PDA, which would communicate with the computer system. The shopper could utilize a Smart Card which carries the items. Menus provided on the computer system or a bar code scanner and a set of bar codes could be used to select the items. The shopper could use a keyboard, touch screen or other device to input the items. The shopper could also input a list via a scanner. From a remote location the shopper could upload the items via the Internet or other network. In one embodiment, the items entered in step 102 are uniquely defined, for example by a bar code or a product name such as particular brand and style of peanut butter. However, in an alternate embodiment, the items could correspond to categories of products that are preferably located close to each other. For example, items could be soap, peanut butter, or a particular brand of peanut butter.

The location(s) of the item(s) on the list are determined, via step 104. In a preferred embodiment, step 104 is performed by accessing a database of products. The database is preferably provided by the retailer. The database preferably includes at least the products and the corresponding locations. The database may be organized by uniquely identifiable products, such as a particular brand of peanut butter, by categories of products, such as peanut butter, or in another manner. Each location is preferably a small area, such as a section of a shelf containing the corresponding item or a region in front of that section of the shelf. In such an embodiment, step 104 would include comparing the items on the list to the products in the database to find matches. Step 104 would also include identifying a location of a particular item as the corresponding region or section of shelf for the match. Furthermore, step 104 may not find the locations of all of the items on the list. For example, some items may not have a match because the retailer might not carry a particular item or the item may be sold out. In such a case, step 104 preferably includes returning a message indicating the items not found. However, in another embodiment, no message may be returned.

Based upon the location(s) of the item(s) found in step 104, a route for the shopper is determined, via step 106. The route takes the shopper to the location(s) of all of the items found. Furthermore, the route need not take the shopper to the item(s) in the order in which the item(s) were entered by the shopper. In a preferred embodiment, the route determined in step 106 is the shortest, most efficient route for the shopper. In such an embodiment, step 106 includes determining the distances between different items and selecting a route that minimizes the distance between each item and a next item, and/or the shortest overall route. In an alternate embodiment, a different route could be determined. In yet another alternate embodiment, multiple routes could be determined and provided to the user, thereby allowing the user to select the desired route. The routes determined in step 106 are preferably provided to the shopper. The route could be provided by a print out or a display. The route could take the form of directions, a map or, in the case of a robotic cart, driving the robotic cart to the locations on the route.

The shopper is allowed to edit the item(s) desired, via step 108. Thus, a shopper may enter one or more additional items or may delete one or more items in step 108. Consequently, the shopper can adjust the list while shopping. In a preferred embodiment, the shopper can perform step 108, editing the desired item(s), at any time during shopping. Also in a preferred embodiment, the shopper can edit the list of desired item(s) multiple times while shopping. The location(s) of new item(s), if any, are determined, via step 110. Step 110 is preferably performed in an analogous manner to step 106. Thus, the new item(s) are preferably compared to products in the database and the locations of any matches returned. The route is re-determined, or updated, to reflect edits made by the shopper, via step 112. Thus, any new items for which locations are found and any deletions made by the shopper are accounted for in step 112. In a preferred embodiment, the updated route determined in step 112 is the shortest route to the location(s) of the remaining item(s) desired. The route determined in step 112 is provided to the shopper, preferably using the same means as the route initially determined in step 106.

Figure 2A:
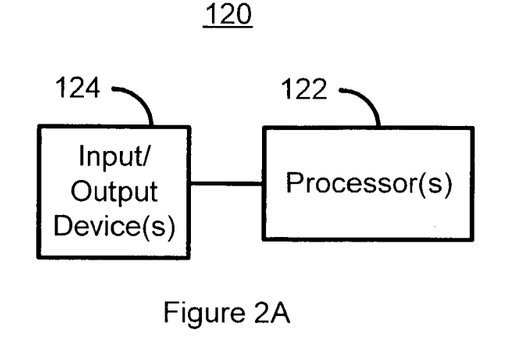
FIG. 2A is a block diagram of one embodiment of a system in accordance with the present invention for assisting a shopper in navigating to locate desired items.
Figure 2B:
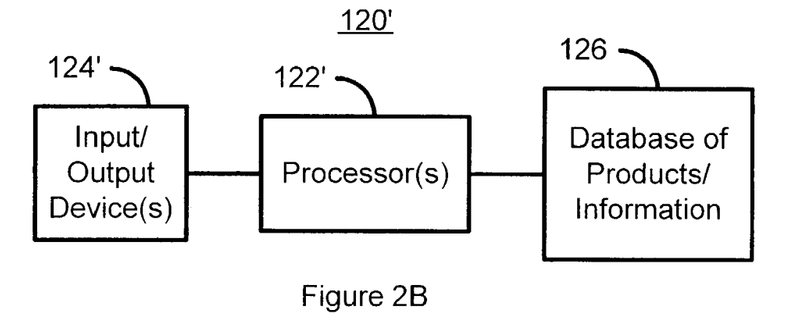
FIG. 2B is a block diagram of another embodiment of a system in accordance with the present invention for assisting a shopper in navigating to locate desired items.

FIGS. 2A–2B are block diagrams of embodiments of systems 120 and 120', respectively, in accordance with the present invention for assisting a shopper in navigating to locate desired items. FIG. 2A depicts the system 120 including processor(s) 122 and I/O device(s) 124. The system 120 can be used to implement the method 100. Thus, the I/O device(s) 124 are used to communicate with the shopper. The I/O devices 124 might include devices such as keyboard(s), a touch screen, a display, an IR port for communicating with computer devices such as a PDA, connection with the Internet to communicate with shoppers located elsewhere, a scanner, and/or a printing device. Thus, the shopper inputs the items to the system 120 via the I/O device(s) 124 and, if a robotic cart is not used, receives a route from the I/O device(s). In one embodiment, if a robotic cart is used, the shopper may still receive the route from the I/O device(s) 124. However, because a robotic cart, described below, also drives to the locations of the items, in an alternate embodiment, the shopper may not receive the route from the I/O device(s) 124. In still another embodiment, the shopper may choose whether or not to receive the route. The shopper also edits the item(s) using one or more of the I/O devices 124. Thus, the I/O devices 124 are used to receive the items the shopper is initially interested in as well as any changes the shopper has. Finally, in an embodiment where the retailer also markets products to the user, the I/O device(s) 124 can be used to provide the shopper with information on substitute and/or additional products.

The processor(s) 122 are preferably used to implement steps 104, 106, 110 and 112. However, one or more of the steps may be performed using another device. Moreover, although the processor(s) 122 are depicted together, nothing prevents one or more of the processor(s) 122 from be located remote from the remainder of the system 120 and accessed, for example, through the I/O device(s) 124. For example, the system 100 may be coupled to the remote processor(s) (not explicitly shown) via an RF port among the I/O device(s) 124. Thus, the processor(s) 122 determine the locations of the items entered by the user if the items are available. The processor(s) 122 might also return an error message or substitute products if any items entered by the shopper are not available. For example, if there is an item that is sold out or not carried by the retailer, the processor might provide a message to the shopper via the I/O devices 124. The message provided could include substitute products marketed by the retailer. The processor(s) 122 would also determine the route and recalculate the route based upon any additions or deletions to the desired items that the shopper makes. In one embodiment, the processor 122 might also provide the shopper with information relating to substitute and/or additional products based upon the items the shopper has entered. For example, the processor 122 might provide the shopper with discounts, coupons, specials, generic substitutes, or information relating to products sold by the retailer.

FIG. 2B depicts another embodiment of a system 120' in accordance with the present invention for assisting shoppers. The major components of the system 120' have analogous structure and/or function as the system 120 and, therefore, are labeled similarly. Thus, the system 120' includes processor(s) 122' and I/O device(s) 124'. In addition, the system 120' communicates with a database 126. The database 126 may or may not reside in a location remote from the processor(s) 122' and I/O device(s) 124'. The database 126 includes information about the products carried by the retailer. For example, the database 126 might include the identity of products such as a bar code, the location of the products, the price of the products, the availability of the products and substitutes for the products. Thus, the processor(s) 122' might use the database 126 to determine the locations of the items entered, whether items entered by the shopper are available, substitutes for the items entered by the shopper, discounts, or other information used to assist the shopper.

The systems 120 and 120' may take a number of forms. In one embodiment, the systems 120 and 120' may reside in a kiosk or kiosks which the customer has access to during shopping. In such a case, the route(s) are preferably printed out so that the shopper can more readily use the route during their shopping trip. In another embodiment, the systems 120 and 120' may reside on a computer system that is attached to a conventional shopping cart. In such an embodiment, the route may merely be displayed on a screen. In a third embodiment, the systems 120 and 120' may be part of a robotic cart which automatically drives the shopper to the locations on the route, stops at each location and, upon the proper command being entered by the shopper, drives to the next location.

In one embodiment, the systems 120 and 120' may also include store locator sensors (not shown). The store locator sensor(s) sense the location of the cart within the store. Consequently, the processor(s) 122 and 122', respectively, can determine whether the cart has strayed from the selected route and can recalculate the desired route and/or redirect the shopper to the route.

Using the system 120 and/or 120' and the method 100, a shopper may be better able to find the items desired. The route used by the shopper may also be the shortest, most efficient route. Consequently, the shopper need not spend time back tracking for forgotten items. In addition, the shopper is allowed to edit the items that are desired to be purchased. The items and route to the items can thus respond to the shoppers changing desires. For example, the shopper might remember an item omitted, might decide not to purchase certain items, or might respond to marketing in the store by desiring to purchase additional and/or different items. The route can then be updated to ensure that the remainder of the items can be found, preferably in the most efficient manner. Furthermore, because the shopper inputs the items desired, the retailer may be better able to individually tailor marketing of products to each shopper while the shopper is in the store.

Figure 3:
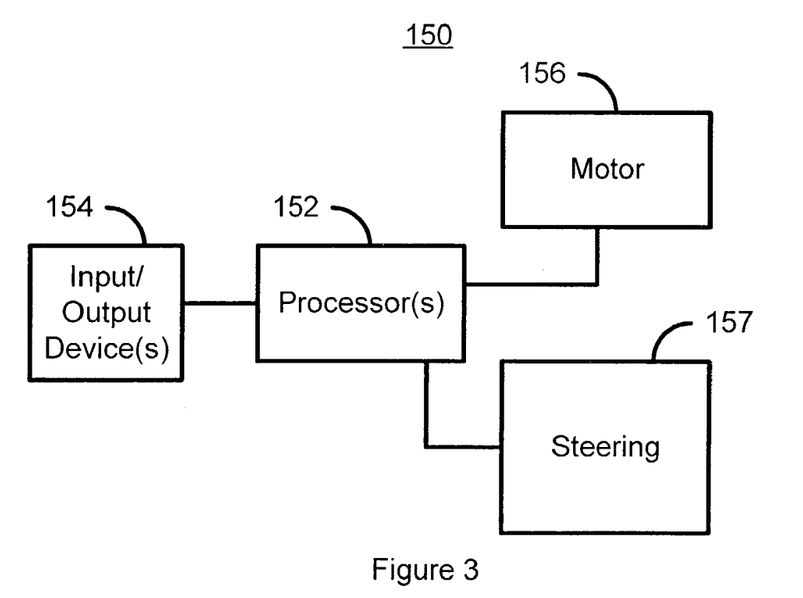
FIG. 3 is a block diagram depicting one embodiment of a robotic cart in accordance with the present invention that assists a shopper in navigating to locate desired items.

FIG. 3 is a block diagram depicting one embodiment of one such robotic cart 150 in accordance with the present invention that assists a shopper in navigating to locate desired items. The robotic cart includes processor(s) 152, I/O device(s) 154, motor 156 and steering 157. The robotic cart also includes other features present in conventional carts, such as a basket and wheels (not shown). The processor(s) 152 are analogous to processor(s) 122 and 122'. Similarly, the I/O device(s) 154 are analogous to the I/O device(s) 124 and 124'. Thus, the processors 152 and I/O device(s) 154 are preferably capable of performing many, if not all, of the functions of the processors 122 and 122' and the I/O devices 124 and 124', respectively. The robotic cart 150 also includes a motor 156 coupled with the processor(s) 152. The motor 156 is used to drive the robotic cart 150. One of ordinary skill in the art will also readily recognize that the robotic cart 150 may also include other elements, such as brakes and a battery, which are not shown for clarity. One of ordinary skill in the art will also readily recognize that the robotic cart 150 also preferably includes features such as a basket, wheels, and a handle that are present on conventional shopping carts.

Figure 4:
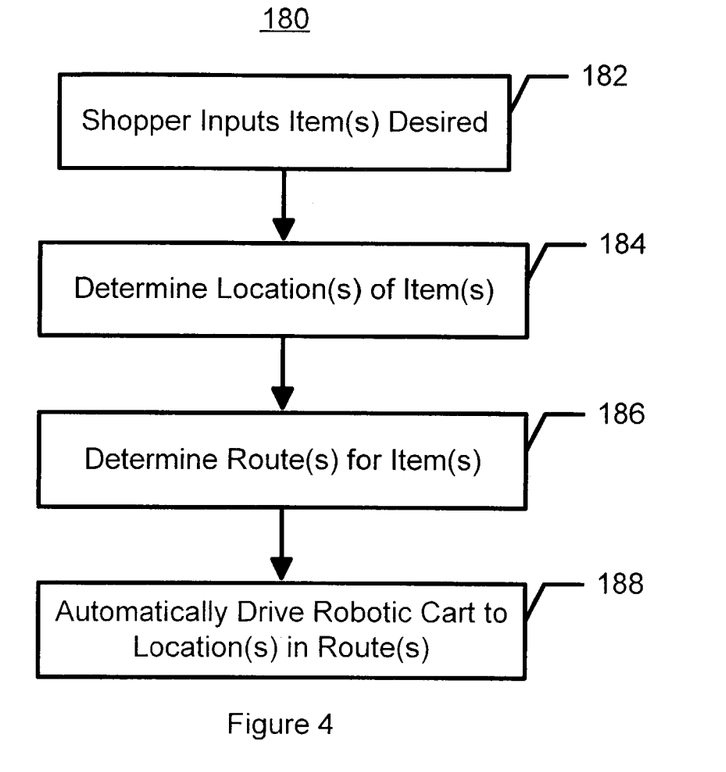
FIG. 4 is a flow chart depicting one embodiment of a method 180 for using robotic cart in accordance with the present invention that assists a shopper in navigating to locate desired items.

FIG. 4 is a block diagram depicting one embodiment of a method 180 for using robotic cart in accordance with the present invention that assists a shopper in navigating to locate desired items. The method 180 is described in conjunction with the robotic cart 150. However, one of ordinary skill in the art will readily recognize that the method 180 is consistent with other robotic carts (not shown) having additional and/or different components.

Referring to FIGS. 3 and 4, a shopper inputs the item(s) of interest to the robotic cart 150, via step 182. To do so, the shopper preferably utilizes one or more of the I/O device(s) 154. For example, a shopper might have a shopping list including multiple items for a trip to the grocery store, which would be entered in step 182. The shopper could enter the items in a number of ways, depending upon the I/O device(s)

154 available. In one embodiment, the items entered in step 182 are uniquely defined. In an alternate embodiment, the items could correspond to categories of products that are preferably located close to each other.

The location(s) of the item(s) on the list are determined, via step 184. Step 184 is preferably performed by one or more of the processor(s) 152. In a preferred embodiment, step 184 is performed by the processor(s) accessing a database (not shown) of products. In one embodiment, the database could be part of the robotic cart 150. However, in another embodiment, the database is remote from the robotic cart 150. Thus, the robotic cart 150 would communicate with the remote database via one of the I/O device(s) 154. The database is preferably analogous to the database 126 depicted in FIG. 2B. Thus, the database preferably includes at least the products and the corresponding locations, as well as other information such as price. The database may be organized by uniquely identifiable products, by categories of products, or in another manner. Each location is preferably a small area, such as a section of a shelf containing the corresponding item or a region in front of that section of the shelf. Step 184 preferably includes comparing the items on the list to the products in the database to find matches and identifying a location of each item having a match as the corresponding region or section of shelf for the match. Furthermore, the locations of all of the items may not be found. For example, a match might not be found if the retailer does not carry a particular item or if the item is sold out. In such a case, step 184 may return a message indicating the items not found.

Based upon the location(s) of the item(s) found in step 184, a route for the shopper is determined, via step 186. Step 186 is also preferably performed by the processor(s) 152. The route takes the shopper to the location(s) of all of the items found. Furthermore, the route need not take the shopper to the item(s) in the order in which the item(s) were entered by the shopper. In a preferred embodiment, the route determined in step 186 is the shortest, most efficient route for the shopper. In such an embodiment, step 186 includes determining the distances between different items and selecting a route that minimizes the distance between each item and a next item, and/or the shortest overall route. In an alternate embodiment, a different route could be determined. In yet another alternate embodiment, multiple routes could be determined and provided to the user, thereby allowing the user to select the desired route. The routes determined in step 186 are preferably provided to the shopper so that the shopper can select one. The route would preferably be provided on a display (not explicitly shown).

The robotic cart automatically drives to the location(s) on the route, via step 188. In a preferred embodiment, the processor(s) 152 control the motor 156 as well as other components of the robotic cart 150 such as the steering 157. In a preferred embodiment, the robotic cart 150 moves to each item for which a location has been found. When the robotic cart 150 reaches the location for a particular item, the robotic cart stops. When desired, for example after the item has been selected and placed in the cart, the shopper restarts the robotic cart 150. The robotic cart 150 would then drive to the next location. In a preferred embodiment, when finished, the shopper would direct the cart to the checkout stand. In one embodiment, the processor(s) 152, motor 156, and steering 157 could be turned off so that the shopper could manually direct the cart. Also in a preferred embodiment, the robotic cart 150 would be capable of navigating a path around obstacles, such as other shoppers, other carts or products.

Figure 5:
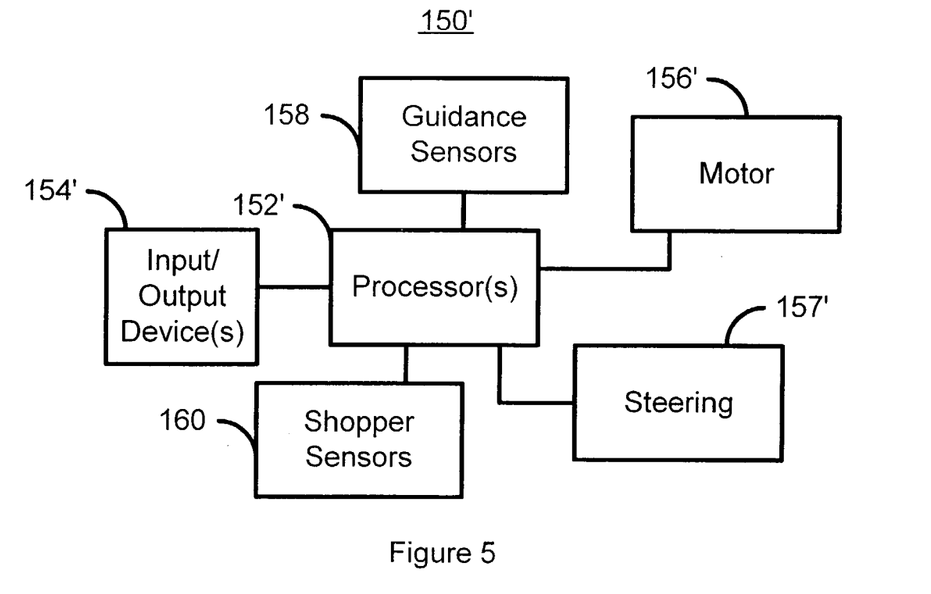
FIG. 5 is a block diagram depicting another embodiment of a robotic cart in accordance with the present invention that assists a shopper in navigating to locate desired items.

FIG. 5 is a block diagram depicting another embodiment of a robotic cart 150' in accordance with the present invention that assists a shopper in navigating to locate desired items. The robotic cart 150' is analogous to the robotic cart 150 and thus includes analogous components 152', 154' and 156'. In addition, the robotic cart 150' preferably implements the method 180. The robotic cart 150' also includes sensors 158 and 160. In alternate embodiments, either the sensors 158 or the sensors 160 might be used. In a preferred embodiment, guiding sensors 160 are used to help the robotic cart 150 navigate. Thus, the guiding sensors 160, in combination with the processor(s) 152', would be capable of detecting objects that are in proximity to the robotic cart 150'. Using this information, the robotic cart 150' would be capable of controlling the motor 156' and steering 157' to avoid the objects. In another embodiment, the guidance sensors 158 include store locator sensor(s). The store locator sensor(s) sense the location of the cart within the store. Consequently, the processor(s) 152' can determine whether the robotic cart 150' has strayed from the selected route and can recalculate the desired route and/or redirect the shopper to the route.

The shopper sensors 160 are coupled with the processor(s) 152'. The shopper sensors 160 are used to determine whether the shopper is in the vicinity of the robotic cart 150'. This would aid in ensuring that the robotic cart 150' does not leave the shopper behind. For example, the shopper sensors 160 might be placed in the handle (not explicitly shown) of the robotic cart 150'. When the shopper sensors 160 indicate that the shopper is not touching the handle of the robotic cart 150', the processor(s) 152' would cause the robotic cart 150' to stop, for example by shutting down the motor 156'.

Figure 6A:
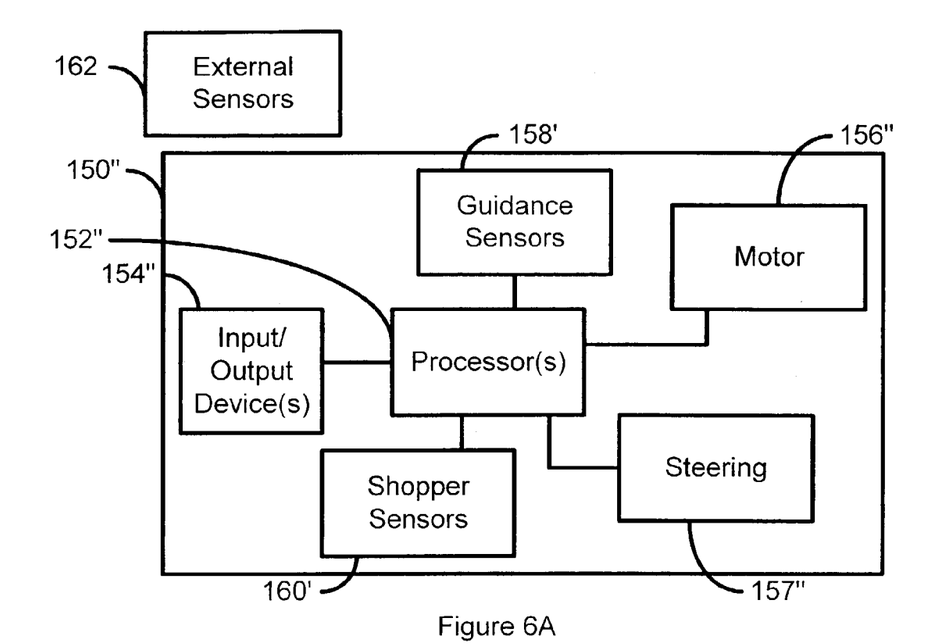
FIG. 6A is a block diagram depicting one embodiment of a system including a robotic cart in accordance with the present invention that assists a shopper in navigating to locate desired items.

FIG. 6A is a block diagram depicting one embodiment of a system including a robotic cart 150" in accordance with the present invention that assists a shopper in navigating to locate desired items. The robotic cart 150" is analogous to the robotic carts 150 and 150'. Consequently, components of the robotic cart 150" are labeled similarly. The system includes external sensors 162 that function with the robotic cart's processor(s) 152". The external sensors 162 could include video cameras or other sensors mounted in the aisles of the store. The external sensors 162 would provide data relating to the location of the robotic cart 150" and, in some embodiments, relating to the speed or other properties of the robotic cart 150". Using the information obtained from the external sensors 162, the processor(s) 152" control the motor 156" and steering 157" to navigate through the store.

Figure 6B:
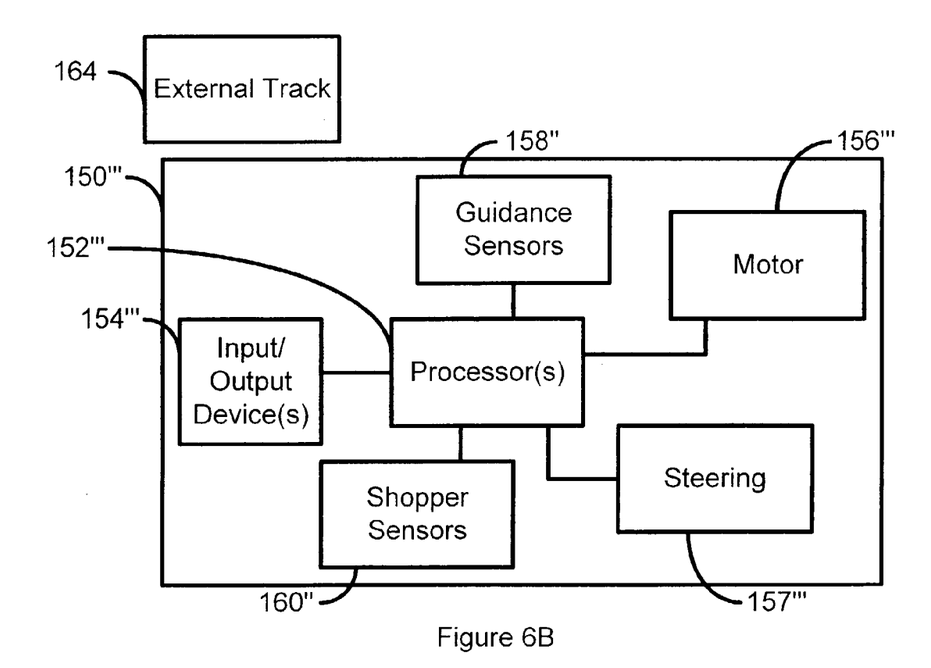
FIG. 6B is a block diagram depicting another embodiment of a system including a robotic cart in accordance with the present invention that assists a shopper in navigating to locate desired items.

FIG. 6B is a block diagram depicting another embodiment of a system including a robotic cart 150''' in accordance with the present invention that assists a shopper in navigating to locate desired items. The robotic cart 150''' is analogous to the robotic carts 150, 150', and 150". In addition, the systems 150, 150', 150" and 150''' could be combined. Consequently, components of the robotic cart 150''' are labeled similarly. The system includes a track 164 that function with the robotic cart's processor(s) 152'''. The track 164 would be laid throughout the store to allow one or more robotic carts 150''' to navigate using the track 164. The robotic cart 150''' would follow portions of the track 164 through the store. Using the information obtained from the external sensors 162, the processor(s) 152" control the motor 156" and steering 157" to navigate through the store.

Because of the use of the method 180 and robotic carts 150, 150', 150" and/or 150''', shoppers can more easily and efficiently locate the desired items. In addition, the method 180 and robotic carts 150, 150', 150" and/or 150''' would aid shoppers that are unable to push a heavy cart through the store. Furthermore, as discussed above with respect to the method 100 and systems 120 and 120', a shopper may be better able to find the items desired because the method 180 and robotic carts 150, 150', 150" and/or 150''' provide this information. Because the shortest route containing all of the items located is preferably used, the route used by the shopper is the most efficient. Consequently, the shopper need not spend time back tracking for forgotten items. In addition, if the method 100 is also used with the robotic carts 150, 150', 150" and/or 150''', the shopper is allowed to edit the items that are desired to be purchased. The items and route to the items can thus respond to the shoppers changing desires. The route can then be updated to ensure that the remainder of the items can be found, preferably in the most efficient manner. Furthermore, because the shopper inputs the items desired, the retailer may be better able to individually tailor marketing of products to each shopper while the shopper is in the store.

A method and system has been disclosed for improving the ability of a consumer to locate items within a store and navigate through the store. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for assisting a shopper in obtaining at least one item desired by the shopper, the method comprising the step of:
    allowing the shopper to provide the at least one item to a computer system;
    determining at least one location of the at least one item using the computer system;
    determining a route including the at least one location using the computer system, the at least one item including a plurality of items, the route including the plurality of items and being a shortest route for the plurality of items;
    allowing the shopper to edit the at least one item after the route has been determined;
    determining an additional location for a new item using the computer system if the new item has been entered; and
    re-determining the route using the computer system based on the shopper editing the at least one item, the route being the shortest route for the plurality of items and the new item.

2. The method of claim 1 wherein the re-determining step further includes the step of:
    using the computer system to re-determine the route to include the additional location of the new item if the new item has been entered; and
    using the computer system to re-determine the route to omit any of the at least one item that has been deleted by the shopper editing the at least one item.

3. The method of claim 2 wherein a database includes a plurality of products for sale, each of the plurality of products having a corresponding location, and wherein the location determining step further includes the step of:
    comparing the at least one item to the plurality of products in the database to determine at least one match, if any, for the at least one item; and
    setting the at least one location as the corresponding location for each of the at least one match if the at least one match exists.

4. The method of claim 3 wherein the additional location determining step further includes the step of:
    comparing the new item to the plurality of products in the database to determine a new match, if any, in the plurality of products for the new item; and
    setting the new location as the corresponding location for the new match if a new match exists.

5. The method of claim 1 wherein a portion of the least one item corresponds to a category of products of products being located in a region and wherein the location determining step further includes the step of:
    setting the location of the portion of the at least one item as the region of the products.

6. The method of claim 1 wherein the shortest route determining step further includes the steps of:
    determining a plurality of paths between each of the at least one item; and
    selecting a combination of the plurality of paths having the shortest distance as the shortest route.

7. The method of claim 1 wherein the computer system resides in a kiosk.

8. The method of claim 1 wherein the computer system resides on a shopping cart.

9. The method of claim 1 wherein the shopper has a computer device and wherein the allowing step further includes the step of:
    allowing the shopper to enter the at least one item via the computer device.

10. The method of claim 9 wherein the computer device is a personal digital assistant.

11. The method of claim 9 wherein the computer device is a smart card.

12. The method of claim 1 wherein the computer system resides in a robotic cart and wherein the method further includes the step of:
    automatically driving the robotic cart to each of the at least one location on the route.

13. The method of claim 1 wherein the editing step, additional location determining step, and route re-determining step occur at any time during a shopping trip for the shopper.

14. The method of claim 1 further comprising the steps of:
    repeating the editing step, additional location determining step and re-determining step if the shopper desires to make additional changes to the at least one item.

15. A method for assisting a shopper in obtaining at least one item desired by the shopper, the method comprising the step of:
    allowing the shopper to provide the at least one item to a computer system, the computer system residing on a robotic cart;
    determining at least one location of the at least one item using the computer system;
    determining a route including the at least one location using the computer system, the at least one item including a plurality of items, the route including the plurality of items and being a shortest route for the plurality of items;

allowing the shopper to edit the at least one item after the route has been determined;
determining an additional location for a new item using the computer system if the new item has been entered; and
re-determining the route using the computer system based on the shopper editing the at least one item if the shopper edits the at least one item, the route being the shortest route for the plurality of items and the new item; and
automatically driving the robotic cart to each of the at least one location on the route.

16. The method of claim 15 wherein the automatically driving step further includes the steps of:
automatically stopping the robotic cart at each of the at least one location.

17. The method of claim 16 wherein the automatically driving step further includes the step of:
allowing the shopper to restart the robotic cart to drive to a next location of the at least one location.

18. The method of claim 15 wherein the editing step, additional location determining step, and route re-determining step occur at any time during a shopping trip for the shopper.

19. The method of claim 15 further comprising the steps of:
repeating the editing step, additional location determining step and re-determining step if the shopper desires to make additional changes to the at least one item.

20. A computer-readable medium containing a program for assisting a shopper in obtaining at least one item desired by the shopper, the program including instructions for:
allowing the shopper to provide the at least one item to a computer system;
determining at least one location of the at least one item;
determining a route including the at least one location, the at least one item including a plurality of items, the route including the plurality of items and being a shortest route for the plurality of items;
allowing the shopper to edit the at least one item after the route has been determined;
determining an additional location for a new item if the new item has been entered; and re-determining the route based on the shopper editing the at least one item, the route being the shortest route for the plurality of items and the new item.

21. The computer-readable medium of claim 20 wherein the re-determining instructions further includes instructions for:
using the computer system to re-determine the route to include the additional location of the new item if the new item has been entered; and
using the computer system to re-determine the route to omit any of the at least one item that has been deleted by the shopper editing the at least one item.

22. The computer-readable medium of claim 21 wherein a database includes a plurality of products for sale within the store, each of the plurality of products having a corresponding location, and wherein the location determining instructions further include instructions for:
comparing the at least one item to the plurality of products in the database to determine at least one match, if any, for the at least one item; and
setting the at least one location as the corresponding location for each of the at least one match if the at least one match exists.

23. The computer-readable medium of claim 22 wherein the additional location determining instructions further include instructions for:
comparing the new item to the plurality of products in the database to determine a new match, if any, for the new item; and
setting the new location as the corresponding location for the new match if the new match exists.

24. The computer-readable medium of claim 20 wherein a portion of the least one item corresponds to a category of products of products being located in a region and wherein the location determining instructions further includes instructions for:
setting the location of the portion of the at least one item as the region of the products.

25. The computer-readable medium of claim 20 wherein the shortest route determining instructions further include instructions for:
determining a plurality of paths between each of the at least one item; and
selecting a combination of the plurality of paths having the shortest distance as the shortest route.

26. The computer-readable medium of claim 20 wherein the computer system resides in a kiosk.

27. The computer-readable medium of claim 20 wherein the computer system resides on a shopping cart.

28. The computer-readable medium of claim 20 wherein the shopper has a computer device and wherein the allowing instructions further include instructions for:
allowing the shopper to enter the at least one item via the computer device.

29. The computer-readable medium of claim 28 wherein the computer device is a personal digital assistant.

30. The computer-readable medium of claim 28 wherein the computer device is a smart card.

31. The computer-readable medium of claim 20 wherein the computer system resides in a robotic cart and wherein the program further includes instructions for:
automatically driving the robotic cart to each of the at least one location on the route.

32. The computer-readable medium of claim 20 wherein the editing instructions, additional location determining instructions, and route re-determining instructions can be implemented at any time during a shopping trip for the shopper.

33. The computer-readable medium of claim 20 further comprising instructions for:
repeating the editing instructions, additional location determining instructions and re-determining instructions if the shopper desires to make additional changes to the at least one item.

34. A computer-readable medium containing a program for assisting a shopper in obtaining at least one item desired by the shopper, the program including instructions for:
allowing the shopper to provide the at least one item to a computer system, the computer system residing on a robotic shopping cart;
determining at least one location of the at least one item using the computer system;
determining a route including the at least one location using the computer system the at least one item including a plurality of items, the route including the plurality of items and being a shortest route for the plurality of items;
allowing the shopper to edit the at least one item after the route has been determined; determining an additional location for a new item using the computer system if the new item has been entered; and re-determining the route using the computer system based on the shopper editing the at least one item if the shopper edits the at lest one item, the route being the shortest route for the plurality of items and the new item; and automatically driving the robotic cart to each of the at least one location on the route.

35. The computer-readable medium of claim 34 wherein the automatically driving instructions further include instructions for:

automatically stopping the robotic cart at each of the at least one location.

36. The computer-readable medium of claim 34 wherein the automatically driving instructions further include instructions for:

allowing the shopper to restart the robotic cart to drive to a next location of the at least one location.

37. The computer-readable medium of claim 34 wherein the editing instructions, additional location determining instructions, and route re-determining instructions are implemented at any time during a shopping trip for the shopper.

38. The computer-readable medium of claim 34 wherein the program further includes instructions for:

repeating the editing instructions, additional location determining instructions and re-determining instructions if the shopper desires to make additional changes to the at least one item.

39. A system for assisting a shopper in obtaining at least one item desired by the shopper, the system comprising:

at least one input/output device for allowing the shopper to provide the at least one item to the system, for providing to the shopper a route including at least one location for the at least one item, the at least one item including a plurality of items, the route including the plurality of items and being a shortest route for the plurality of items, allowing the shopper to edit the at least one item after the route has been determined, and for providing a new route based upon the shopper editing the at least one item;

a processor for determining the at least one location of the at least one item, for determining the route, for determining an additional location for a new item if the new item has been entered, and for re-determining the route based on the shopper editing the at least one item, the route being the shortest route for the plurality of items and the new item.

40. The system of claim 39 wherein the processor re-determines the new route to include the additional location of the new item if the new item has been entered and to omit any of the at least one item that has been deleted by the shopper editing the at least one item.

41. The system of claim 40 further comprising:

a database of a plurality of products for sale, each of the plurality of products having a corresponding location; and wherein the processor further determines the location of the at least one item by comparing the at least one item to the plurality of products in the database to determine at least one match, if any, for the at least one item and sets the at least one location as the corresponding location for each of the at least one match if the at least one match exists.

42. The system of claim 41 wherein the processor further determines the additional location of the new item by comparing the new item to the plurality of products in the database to determine a new match, if any, for the new item and sets the new location as the corresponding location for the new match if the new match exists.

43. The system of claim 39 wherein a portion of the least one item corresponds to a category of products of products being located in a region and wherein the processor determines the location by setting the location of the portion of the at least one item as the region of the products.

44. The system of claim 39 wherein the processor determines the shortest route by determining a plurality of paths between each of the at least one item and by selecting a combination of the plurality of paths having the shortest distance as the shortest route.

45. The system of claim 39 wherein a portion of the at least one input/output device and processor reside in a kiosk.

46. The system of claim 39 wherein at least a portion of the at least one input/output device and processor resides on a shopping cart.

47. The system of claim 39 wherein the shopper has a computer device and wherein the computer device communicates with the at least one input/output device to allow the shopper to enter the at least one item.

48. The system of claim 47 wherein the computer device is a personal digital assistant.

49. The system of claim 47 wherein the computer device is a smart card.

50. The system of claim 39 wherein a portion of the at least one input/output device and the processor resides in a robotic cart and wherein the robotic cart automatically drives to each of the at least one location on the route.

51. A robotic cart for assisting a shopper in obtaining at least one item desired by the shopper, the robotic cart comprising:

at least one input/output device for allowing the shopper to provide the at least one item to the system and for allowing the shopper to edit the at least one item after a route has been determined;

at least one processor for determining the at least one location of the at least one item, for determining the route including at least one location for the at least one item, for redetermining the route after the shopper has edited the at least one item if the shopper edits the at least one item, and for automatically navigating the robotic cart to each of the at least one location, the at least one item including a plurality of items, the route including the plurality of items and being a shortest route for the plurality of items; and at least one motor for driving the cart along the route in accordance with the at least one processor navigating the robotic cart.

52. The robotic cart of claim 51 wherein the at least one processor further automatically stops the robotic cart at each of the at least one location.

53. The robotic cart of claim 51 wherein the at least one input/output device further allows the shopper to restart the robotic cart to drive to a next location of the at least one location.

54. The robotic cart of claim 51 wherein the at least one processor navigates utilizing a track.

55. The robotic cart of claim 51 wherein the at least one processor navigates utilizing at least one external sensor, the at least one external sensor communicating with the robotic cart.

56. The robotic cart of claim 51 further comprising:
a plurality of sensors, coupled with the at least one processor, for detecting an object in proximity to the cart.

57. The robotic cart of claim 56 wherein the at least one processor further utilizes the plurality of sensors to prevent the robotic cart from hitting the object.

58. The robotic cart of claim 51 further comprising:
means for ensuring that the robotic cart remains in proximity to the shopper.

59. The robotic cart of claim 58 wherein the ensuring means further comprise:

at least one sensor for determining whether the shopper is physically contacting the robotic cart; and wherein the robotic cart only drives while the shopper is physically contacting the robotic cart.

* * * * *